May 3, 1966  J. C. SIMON-SUISSE  3,249,857
BOREHOLE INVESTIGATING APPARATUS HAVING A SUPPORT MEMBER AND
TRANSDUCER MEANS ENCLOSED IN A COMPRESSIVELY STRESSED
SLEEVE MEMBER
Filed Oct. 11, 1962
2 Sheets-Sheet 1
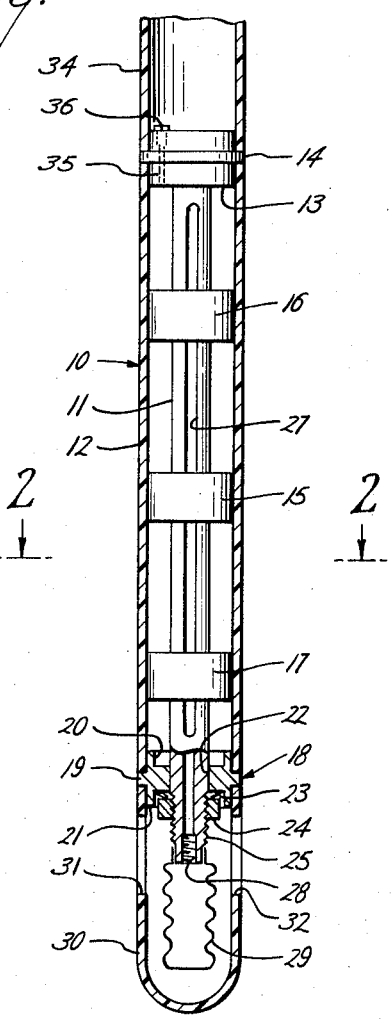
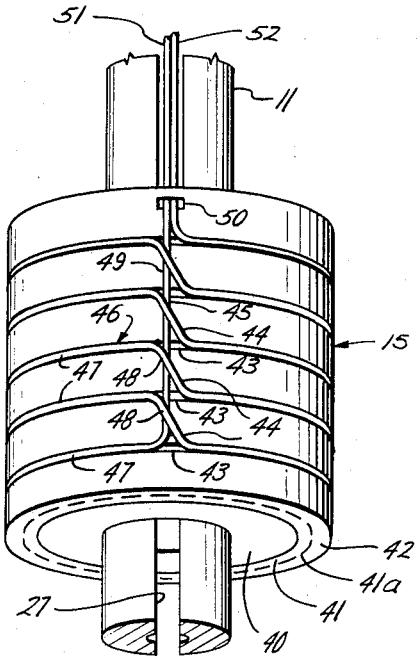
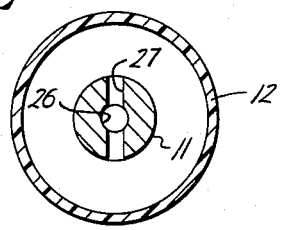
Jean Charles Simon-Suisse
INVENTOR.
BY Richard E. Bee

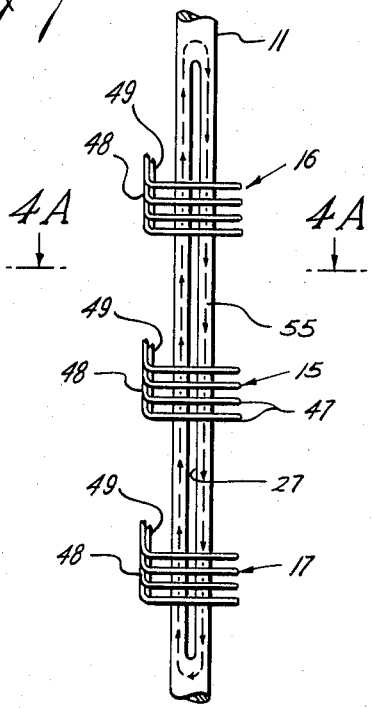
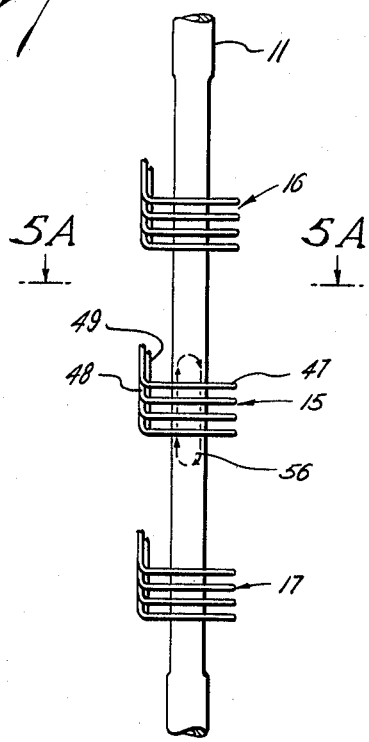
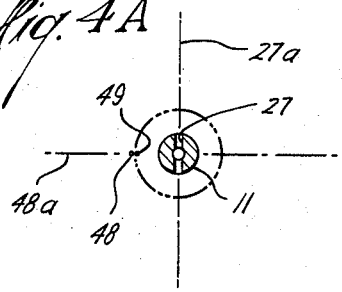
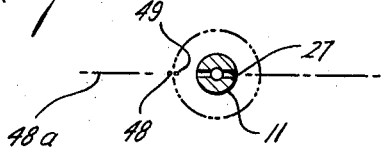

United States Patent Office 3,249,857
Patented May 3, 1966

3,249,857
BOREHOLE INVESTIGATING APPARATUS HAVING A SUPPORT MEMBER AND TRANSDUCER MEANS ENCLOSED IN A COMPRESSIVELY STRESSED SLEEVE MEMBER
Jean Charles Simon-Suisse, Marylleroi, Seine-et-Oise, France, assignor to Societe de Prospection Electrique Schlumberger, S.A., Paris, France, a corporation of France
Filed Oct. 11, 1962, Ser. No. 229,903
Claims priority, application France, Oct. 20, 1961, 876,652
9 Claims. (Cl. 324—6)

This invention relates to borehole investigating apparatus and, particularly, to such apparatus which is adapted for use in boreholes which have been drilled deep into the earth.

In seeking to determine the presence and depth of hydrocarbon-bearing zones (oil, gas, etc.) that may exist in the subsurface earth formations penetrated by a borehole drilled into the earth, various types of investigating apparatus are frequently lowered into the borehole for measuring various properties of the formations adjacent the borehole. Also, during the completion or reconditioning of the borehole for production purposes, it is frequently necessary to lower various types of investigating apparatus into the borehole for determining the nature or condition of various subsurface materials in and around the borehole. In the course of such investigations, the investigating apparatus is subjected to high fluid pressures (e.g., 17,000 p.s.i.) at high temperatures (e.g., 390° F.). Consequently, such investigating apparatus must be designed and manufactured with special care for withstanding these severe conditions.

One form of borehole investigating apparatus that has been heretofore proposed is described in U.S. Patent No. 2,964,698, granted to A. E. Lehmberg, Jr., on December 13, 1960. In the illustrated embodiment, this apparatus employs transmitting and receiving coils for inducing electrical current flow in the subsurface earth formations and for measuring the magnitude of such current flow. One of the problems is to protect the transmitting and receiving coils from the destructive effects of the drilling fluid contained in the borehole and this problem is aggravated by the high temperature and high pressure of the drilling fluid. The desired protection is obtained by mounting the coil system on a central support member and then providing a fluid-impermeable sleeve member which encloses both the coil system and central support member, the ends of the sleeve member being secured to the ends of the central support member in such a manner as to establish a fluid-tight seal therebetween. Means are also provided for equalizing the pressures inside and outside of the fluid-tight housing formed by the sleeve member.

As a consequence of this form of construction, the transducer elements of the investigating apparatus, in this case, the transmitter and receiver coils, are completely protected from the drilling fluid. Also, since the pressures sustained inside and outside the fluid-impermeable sleeve member are always balanced, the apparatus can be used for long periods of time without experiencing any mechanical failure thereof. In addition, with this form of construction the apparatus can be easily disassembled. This enables a relatively easy and accurate positioning of the various transducer elements and also enables any repairs required of such elements to be made relatively easily and relatively quickly.

While the foregoing apparatus has been proven to provide satisfactory and advantageous operation in boreholes of conventional size (eight inch diameter), it has been found to be rather difficult to construct apparatus of this type for use in small diameter (three inch) boreholes. A major problem is that the portion of the apparatus containing the transducer element is, of necessity, approximately 10 feet in length. Consequently, when the dimensions of the apparatus are reduced to a small diameter, on the order of three inches or less, it is found that the mechanical strength and stiffness of the apparatus is not great enough to enable satisfactory manipulation of the apparatus in the borehole.

It is an object of the invention, therefore, to provide new and improved borehole investigating apparatus for investigating subsurface borehole conditions and subsurface earth formation conditions.

It is another object of the invention to provide new and improved borehole investigating apparatus of a fluid-tight character.

It is a further object of the invention to provide new and improved borehole investigating apparatus which is adapted for use in small diameter boreholes.

In accordance with one feature of the invention, a borehole investigating apparatus comprises a supporting head and an elongated support member having one end secured to the supporting head. The apparatus also includes transducer means secured to the support member. The apparatus further includes an elongated sleeve member enclosing the support member and transducer means and having one end engaging the supporting head. The apparatus further includes securing means engaging the other end of the sleeve member and secured to the support member at a relative longitudinal location that creates and maintains a very substantial longitudinal compressive stress in the sleeve member.

In accordance with another feature of the invention, there is provided a method of constructing a borehole investigating apparatus having an elongated central support member and an elongated outer sleeve member and adapted to house transducer means within the confines of the sleeve member. This method comprises applying longitudinal force to at least one of the members for producing an elastic deformation of the longitudinal dimension thereof. The method also includes rigidly securing the ends of the sleeve member to the ends of the central support member while maintaining such elastic deformation. The method further includes thereafter removing the longitudinal force.

For a better understanding of the present invention, together with other and further objects thereof, reference is had to the following description taken in connection with the accompanying drawings, the scope of the invention being pointed out in the appended claims.

Referring to the drawings:

FIG. 1 is a partly cross-sectional view showing a representative embodiment of borehole investigating apparatus constructed in accordance with the present invention;

FIG. 2 is a cross-sectional view taken along the section line 2—2 of FIG. 1;

FIG. 3 is an enlarged view of one of the coils of the FIG. 1 apparatus;

FIGS. 4 and 5 are schematic representations of different possible relationships between portions of the FIG. 1 apparatus; and FIGS. 4A and 5A are cross-sectional views taken along the corresponding designated section lines of FIGS. 4 and 5.

Referring to FIG. 1 of the drawings, there is shown a representative embodiment of borehole investigating apparatus constructed in accordance with the present invention for investigating subsurface conditions in a borehole drilled deep into the earth. The apparatus of FIG. 1 represents the case where the transducer means for doing the subsurface investigation takes the form of a coil system for measuring the electrical conductivity of the material surrounding the investigating apparatus and, in particular, the electrical conductivity of the adjacent earth formations. This is a particularly good example since this type of transducer means places relatively severe requirements on the construction of the apparatus. It is to be carefully noted, however, that, at least in its broader aspects, the present invention is not limited to this particular type of transducers. The present apparatus may instead be used with, for example, either sonic or radioactivity type transducers.

Considering now the details of the FIG. 1 embodiment, there is shown in FIG. 1 a borehole investigating apparatus 10 having an elongated generally-cylindrical central support member 11 and an outer elongated cylindrical fluid-impermeable sleeve member 12 which encloses the support member 11. The upper end of the central support member 11 is secured to a generally-cylindrical fluid-impermeable supporting head 13. Supporting head 13 is provided with an outer flange portion 14 encircling the circumference thereof. The upper end of sleeve member 12 engages the shoulder formed by flange portion 14 and the lower part of supporting head 13. A plurality of transducer means or transducer elements are secured to the central support member 11 intermediate the two ends thereof. In the present embodiment, these transducer elements take the form of a transmitter coil 15 and a pair of receiver coils 16 and 17 which are spaced apart above and below the transmitter coil 15.

The apparatus 10 also includes securing means 18 engaging the lower end of the sleeve member 12 and secured to the support member 11. The securing means 18 includes a circular fluid-impermeable mounting ring 19 having upper and lower circular collar portions 20 and 21 which are set in from the outer edge of the mounting ring 19. The lower end of sleeve member 12 engages the shoulder formed by the upper collar portion 20 and the main body of the mounting ring 19. Mounting ring 19 is also provided with a center passageway 22 having a diameter which provides a snug fit with the outer surface of the support member 11 and yet is not so tight or permanent that the mounting ring 19 cannot be moved longitudinally on the support member 11, provided the appropriate force is utilized. The securing means 18 also includes a resilient spring-like member of considerable stiffness in the form of a Belleville washer 23. Washer 23 is of conical shape and encircles the support member 11. The securing means 18 further includes an internally-threaded nut 24 which is threaded onto a threaded lower portion 25 of the support member 11.

As seen in FIG. 2, the central support member 11 is provided with a center passageway 26 which extends from one end of the support member 11 to the other. Over the middle portion of the support member 11, this center passageway 26 is connected to the region exterior to the support member 11 by means of a lateral passageway provided, in this embodiment, by a longitudinal slot 27 which extends completely across the diameter of the support member 11 and which intersects the center passageway 26 as indicated in FIG. 2. As seen in FIG. 1, the slot 27 does not extend in a longitudinal direction completely to the ends of support member 11. It terminates a short distance on the outer sides of the outer most coils 16 and 17. The lower end 28 of the central passageway 26 is internally threaded for purposes which will be explained hereinafter.

Flexible fluid-impermeable means represented by a bellows member 29 is secured to the lower end of the central support member 11. This isolates the bottom opening of center passageway 26 from the surrounding environment and completes the fluid-tight enclosure about the transducer elements represented by coils 15, 16 and 17. The bellows member 29 is constructed of non-magnetic material such as a non-magnetic metal. A nose piece 30 is secured to the mounting ring 19 around the periphery of the lower collar portion 21. Two large passageways 31 and 32 are provided in the sides of the nose piece 30.

At the upper end of the investigating apparatus 10, an elongated fluid-tight housing section 34, only a portion of which is shown, is secured to the upper side of the supporting head 13. This fluid-tight housing 34 is adapted to house various electrical circuits which are used to operate the coil system. Also, in practice, coupling means are usually provided for connecting and disconnecting the housing 34 and the investigating apparatus 10 from one another, though, for sake of simplicity, such coupling means are not shown in the drawings. In this respect, the supporting head 13 constitutes part of the investigating apparatus 10 and remains intact therewith for the case where a coupling means is provided.

In the case of coil systems, such coil systems are extremely sensitive to the presence of metallic materials—especially those which exhibit appreciable magnetic permeability. Consequently, the investigating apparatus 10 should be constructed with a minimum of metal material and any such material which is used must be selected and located with extreme care. It is desirable, however, to make the central support member 11 out of a metal material in order to increase the mechanical strength of the apparatus. Consequently, in the present embodiment, the support member 11 is made of a non-magnetic metal. A particularly suitable metal for this purpose is austenitic stainless steel because this material has good mechanical strength and is essentially non-magnetic in character. The supporting head 13, the mounting ring 19, the conical washer 23 and the nut 24 are also made of non-magnetic material such as this same austenitic stainless steel.

The sleeve member 12, on the other hand, must be made of a material which is non-conductive as well as non-magnetic in order to prevent undue attenuation of the electromagnetic energy passing from and to the coil system. It must, nevertheless, possess a high degree of mechanical strength. Consequently, the sleeve member 12 is constructed of a tough plastic material such as a laminated fiber glass cloth material impregnated with epoxy resin. Nose piece 30 is also constructed of this same plastic material.

The interior of the fluid-tight chamber formed by the sleeve member 12 as well as the interior of the bellows member 29 is completely filled with a suitable silicon oil. This oil is selected such that, when the investigating apparatus is descending in the borehole, expansion of the oil with temperature is largely offset by the crushing of the bellows 29 due to the increasing pressure so that the volume of the oil as a whole remains substantially constant. The quantity of the oil used, the thermal coefficient of expansion and the coefficient of compressibility of this oil, as well as the stiffness and volume of the bellows member 29, are selected to accomplish this purpose. In order to adapt the volume of the oil to the volume of the chosen bellows, suitable spacer members of plastic material and of appropriate size may be mounted on the central support member 11 intermediate the coils 15, 16 and 17. For sake of simplicity, these are not shown in the drawings.

The interior of the apparatus 10 is filled with the silicon oil by way of a passageway 35 extending through the supporting head 13, a suitable plug 36 being used to seal off the passageway 35 after the apparatus 10 is filled.

An important feature of the present invention is that the outer sleeve member 12 is placed in a highly prestressed condition during the construction thereof and before the apparatus is used in a borehole. This is accomplished by means of a hydraulic jack which, for simplicity, is not shown in the drawings. In particular, with both the nose piece 30 and the bellows member 29 removed from the remainder of the apparatus, a jack rod integral with the piston of the hydraulic jack is screwed into the threaded portion 28 of the passageway 26 and the cylindrical jack barrel is seated on the periphery of the mounting ring 19. The jack is then operated to apply several thousand pounds of longitudinal pull on the central support member 11 relative to the mounting ring 19 and, hence, the sleeve member 12. For the particular materials mentioned above, this longitudinal force is on the order of 22,000 pounds. The mounting ring 19 is capable of undergoing longitudinal movement under the influence of large forces of this sort. Consequently, the central support member 11 is stretched and the outer sleeve member 12 is compressed, both in the longitudinal direction, care being exercised not to exceed the elastic limits of either the support member 11 or the sleeve member 12.

While the apparatus 10 is maintained in this stressed condition, nut 24 is tightened on the threaded portion 25 until a substantial crushing or compression of the conical washer 23 is produced. Once this adjustment is completed, the pressure applied to the hydraulic jack is removed, the piston rod of the jack is unscrewed from the support member 11 and the jack as a whole removed from the investigating apparatus. Bellows member 29 and nose piece 30 are then secured to the investigating apparatus in the appropriate manner. The investigating apparatus is then filled with silicon oil by way of the passageway 35 in supporting head 13. The investigating apparatus 10 is then ready for use in investigating a subsurface borehole.

As the investigating apparatus 10 is lowered into a borehole, the thermal expansion of the central support member 11 with temperature is somewhat greater than the thermal expansion of the sleeve member 12. The resilient character of the conical washer 23, however, serves to prevent any large changes in the prestressed condition of the apparatus.

Any bending of the apparatus 10 at the level of flange 14 would, in the absence of the prestressing, produce tensile stresses on the fibers on one side of the sleeve member 12. However, the prestressed condition of the sleeve member 12 is sufficient for any such bending that will normally be encountered so that the fibers on the tensile side of the sleeve member 12 actually remain in a state of compression. In other words, the tensile forces due to bending never exceed the prestressed compressive forces. Under such conditions, there is always a fluid-tight sealing engagement at the level of flange 14 even though the upper end of sleeve member 12 is only resting against this flange portion. Also, since the stresses sustained by the sleeve member 12 are always of a compressive nature, the materials composing the sleeve member 12 are specially chosen so as to be able to withstand compression forces.

The prestressed condition of the support member 11 and sleeve member 12 serve to ensure a fluid-tight seal at the two ends of the sleeve member 12. Also, since the internal and external pressures on the sleeve member 12 are balanced by the pressure equalization provided by the bellows member 29, no dangerous pressure differentials are created between the inside and outside of the sleeve member 12 and, hence, this sleeve member can be of a relatively thin and light-weight construction. This pressure balance also enables the passageway 22 in the mounting ring 19 to provide a fluid-tight seal between the mounting ring 19 and the support member 11 without any further precautions being required.

At the upper end of the apparatus 10, it is necessary that the electrical conductors or wires connecting the various coil elements to the electrical circuits contained within the upper housing 34 pass through the supporting head 13. This is achieved by means of suitable fluid-tight passageways through the supporting head 13. Depending on the construction of the upper housing 34 and its manner of coupling to the investigating apparatus 10, it may be necessary that these conductor passageways be constructed to withstand substantial pressure differentials. This, however, presents no appreciable problem.

Since the metal used in the central support member 11 and other metal parts of the investigating apparatus 10 are of a non-magnetic character, no large disturbances are produced in the alternating magnetic field set up by the transmitting coil 15 during the operation of the apparatus. Nevertheless, since these metal parts are somewhat conductive in character, certain precautions must be exercised in order to avoid undesired spurious currents in these metal parts which would undesirably couple with the receiver coils of the system.

One type of precaution which can be taken is in the construction of the coils themselves. This is illustrated in connection with FIG. 3 of the drawings which shows an enlarged view of the transmitter coil 15. As seen in FIG. 3, the coil 15 includes an inner base layer 40, which is composed of plastic material, a second layer 41 of plastic material bearing an electrostatic shield 41a and a third layer 42 of plastic material having a number of grooves or channels cut therein for containing the electrical conductors or wires which form the coil winding. A fourth layer comprising an outer electrostatic shield is also included but, for sake of simplicity, has been omitted from the view of FIG. 3.

The system of grooves cut into the outer surface of the coil supporting layer 42 include a plurality of circular grooves 43 individually encircling the layer 42 and a plurality of angular grooves 44 interconnecting adjacent ones of the circular grooves 43. A single longitudinal groove 45 is provided for running a conductor from the top of the coil form to the lower-most circular groove 43. This longitudinal groove 45 is cut deeper than the other grooves. Also, it is located so that it crosses the angular grooves 44 at their midpoints. A continuous insulated conductor wire 46 is placed in these various grooves in the manner indicated in FIG. 3.

The conductor wire 46 consequently includes circular portions 47 which constitute the significant portion of the coil as far as the desired external investigations are concerned. These circular portions or turns are interconnected by linear portions 48 lying in the angular connecting grooves 44. A longitudinal connecting portion 49 is provided in the longitudinal groove 45. The upper ends of the conductor wire 46 pass through a passageway 50 in the various layers 40, 41 and 42 down to the center of the support member 11. At this point, the ends of conductor wire 46 are connected to suitable lead-in wires 51 and 52 which run through the passageway 26 in the middle of the support member 11.

The receiver coils 16 and 17 are constructed in a similar manner.

The manner in which spurious currents in the metal parts of the apparatus are prevented from occurring will now be considered. Electrical current flowing in the circular portions 43 of the transmitter coil 15 would tend to set up circular current flow in the body of the support member 11 concentric with the longitudinal axis thereof. This, however, cannot occur in the present embodiment because of the presence of the slot 27.

The linear connecting portions 48 and the longitudinal connecting portion of the coil 15 also tend to induce spurious currents in the support member 11. This tendency, however, is considerably reduced by the fact that the longitudinal conductor portion 49 is placed in very close physical relationship with the linear conductor portions 48 and will, in the operation of the apparatus, carry current in a direction opposite to the current flowing in the linear portions 48. Nevertheless, this compensation is not complete and some spurious currents will still exist in the support member 11. The significance of these remaining spurious currents depends upon the orientation of the linear conductor portions 48 with respect to the slot 27. This is explained with reference to FIGS. 4, 4A, 5 and 5A of the drawings.

FIGS. 4 and 4A illustrate the worst possible positioning of the linear connecting portions 48 with respect to the slot 27. In this case, the plane of the slot 27 (axis 27a of FIG. 4A) is at right angles to a radial plane passing through the midpoints of the linear connecting portions 48 (axis 48a of FIG. 4A). As represented in FIG. 4, this orientation enables a circulating current flow, represented by dash line 55, in the body of the support member 11. This is because the magnetic field set up by the linear connecting portions 48 is asymmetrically located relative to the two sides or legs of the support member 11. Consequently, the magnetic field strength is greater in the nearer leg and smaller in the farther leg. This difference in field strength enables a longitudinal current flow down one leg and up the other leg of the support member 11, as indicated by dashed line 55, the end portions of support member 11 completing the electrical circuit. Since this current flows through each of the receiver coils 16 and 17 in a parallel direction with respect to the general longitudinal trend of the linear connecting portions 48, some spurious voltage is induced in these connecting portions and, hence, appears across the terminals of the receiver coils.

The orientation shown in FIG. 5, on the other hand, represents the preferred orientation of the linear connecting portions relative to the slot 27. In this case, the plane of the slot 27 coincides with the plane passing through the midpoints of the linear connecting portions 48. In this case, while the residual magnetic field associated with the linear connecting portions 48 is still asymmetrical with respect to the center of the support member 11, it is nevertheless now symmetrical with respect to the two legs of the support member 11. Consequently, the electromotive forces induced in the two legs of the support member 11 are in the same direction and have identical magnitude distributions as a function of distance from the midpoints of the linear connecting portions 48. Consequently, these induced electromotive forces oppose each other as far as any current flow circulating up one leg member and down the other is concerned. A localized flow current, as indicated by dashed line 56, will occur in each of the legs of support member 11 in the immediate vicinity of the transmitter coil 15. These currents, however, are of a localized nature and do not couple with the receiver coils 16 and 17.

In the construction or re-assembly of the investigating apparatus 10, before the sleeve member 12 is put in place, the coil system is energized with electrical current and the coils 15, 16 and 17, which are initially positioned as indicated in FIG. 5, are slowly rotated back and forth by small amounts to determine in a precise electrical manner the exact optimum orientation of the coils with respect to the slot 27.

As a further embodiment of the present invention, the elongated central support member 11 may instead be made of a non-metallic material such as a tough plastic material having high mechanical strength. A particularly suitable material for this purpose is the laminated fiber glass cloth material impregnated with epoxy resin which, as previously indicated, is the material which is preferred for the construction of the outer sleeve member 12. One or more parts of the securing means 18 at the lower end of the support member 11 may also be made of this same plastic material. In order to provide the necessary rigidity and mechanical strength for an apparatus of small diameter, it is still essential that the central support member 11 and the outer sleeve member 12 be placed in a highly prestressed condition during the construction or assembly of the apparatus. This may be achieved in a manner similar to that previously indicated.

Since, in this second embodiment, the central support member 11 is no longer composed of metallic material, there is no problem with spurious induced currents and the elongated longitudinal slot 27 is preferably omitted. It is, however, still necessary to provide fluid communication between the bellows member 29 and the interior region of the sleeve member 12. Consequently, the center passageway 26 is still provided in the support member 11 and this passageway is connected to the remainder of the region within the sleeve member 12 by means of one or more small lateral passageways drilled into the support member 11 and intersecting the center passageway 26.

As previously indicated, the present invention is not limited to the case where the transducer elements are in the form of electromagnetic induction and reception coils. Instead, for example, the transducer elements, which need not be the same in number as those indicated in FIG. 1, may take the form of sonic or acoustical transducers for emitting and detecting acoustical waves.

From the foregoing description of the various embodiments of the invention, it is seen that borehole investigating apparatus constructed in accordance with the present invention represents apparatus possessing a high degree of rigidity and mechanical strength even though the apparatus is of relatively great length and small diameter. Also, the transducer elements contained within the apparatus are completely protected against the destructive effects of fluids contained in the borehole and this protection is maintained even though the apparatus is subjected to relatively severe mechanical stresses.

While there have been described what are at present considered to be the preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. Borehole investigating apparatus comprising: a supporting head; an elongated support member having one end secured to the supporting head; transducer means secured to the support member; an elongated sleeve member enclosing the support member and transducer means and having one end engaging the supporting head; and securing means engaging the other end of the sleeve member and secured to the support member at a relative longitudinal location that maintains several thousand pounds of longitudinal compressive stress in the sleeve member.

2. Borehole investigating apparatus comprising: a supporting head; an elongated metal support member having one end secured to the supporting head; transducer means secured to the support member; an elongated sleeve member enclosing the support member and transducer means and having one end engaging the supporting head; and securing means engaging the other end of the sleeve member and secured to the support member at a relative longitudinal location that maintains several thousand pounds of longitudinal compressive stress in the sleeve member.

3. Borehole induction logging apparatus comprising: a supporting head; an elongated metal support member composed of austenitic stainless steel and having one end secured to the supporting head; a plurality of induction logging coils secured to the support member; an elongated sleeve member enclosing the support member and induction logging coils and having one end engaging the supporting head; and securing means engaging the other end of the sleeve member and secured to the support member at a relative longitudinal location that maintains several thousand pounds of longitudinal compressive stress in the sleeve member.

4. Borehole investigating apparatus comprising: a supporting head; an elongated plastic support member composed of laminated fiber glass cloth material impregnated with epoxy resin and having one end secured to the supporting head; transducer means secured to the support member; an elongated sleeve member enclosing the support member and transducer means and having one end engaging the supporting head; and securing means engaging the other end of the sleeve member and secured to the support member at a relative longitudinal location that maintains several thousand pounds of longitudinal compressive stress in the sleeve member.

5. Prestressed borehole induction logging apparatus having improved mechanical characteristics comprising: a supporting head; an elongated support member having one end secured to the supporting head; a plurality of induction logging coils secured to the support member; an elongated sleeve member enclosing the support member and induction logging coils and having one end engaging the supporting head; and securing means engaging the other end of the sleeve member and secured to the support member at a relative longitudinal location that maintains several thousand pounds of longitudinal compressive stress in the sleeve member.

6. Borehole investigating apparatus comprising: a supporting head; an elongated support member having one end secured to the supporting head; transducer means secured to the support member; an elongated sleeve member composed of laminated fiber glass cloth material impregnated with epoxy resin and enclosing the support member and transducer means and having one end engaging the supporting head; and securing means engaging the other end of the sleeve member and secured to the support member at a relative longitudinal location that maintains several thousand pounds of longitudinal compressive stress in the sleeve member.

7. Prestressed borehole investigating apparatus having improved mechanical characteristics comprising: a supporting head; an elongated support member having one end secured to the supporting head; transducer means secured to the support member; an elongated sleeve member enclosing the support member and transducer means and having one end engaging the supporting head; and securing means engaging the other end of the sleeve member and secured to the support member at a relative longitudinal location that maintains in excess of ten thousand pounds of longitudinal compressive stress in the sleeve member.

8. Prestressed borehole investigating apparatus having improved mechanical characteristics comprising: a supporting head; a prestressed elongated support member having one end secured to the supporting head and being in a prestressed state of substantial elastic longitudinal elongation; transducer means secured to the support member; a prestressed elongated sleeve member enclosing the support member and transducer means and having one end engaging the supporting head and being in a prestressed state of substantial elastic longitudinal compression; and securing means engaging the other end of the sleeve member and secured to the support member at a relative longitudinal location that maintains in excess of ten thousand pounds of longitudinal stress in both the support member and the sleeve member.

9. Prestressed borehole induction logging apparatus having improved mechanical characteristics comprising: a cylindrical fluid-impermeable supporting head; a prestressed elongated support member having one end secured to the supporting head and having an interior passageway communicating between an outlet on the other end of such member and at least one outlet on the exterior surface of such member intermediate the ends thereof, such support member being in a prestressed state of substantial elastic longitudinal elongation; a plurality of induction logging coils secured to the support member; a prestressed elongated cylindrical fluid-impermeable sleeve member composed of laminated fiber glass cloth material impregnated with epoxy resin and enclosing the support member and the induction logging coils and having one end engaging the supporting head, such sleeve member being in a prestressed state of substantial elastic longitudinal compression; annular fluid-impermeable securing means engaging the other end of the sleeve member and the exterior surface of the support member and secured to the support member at a relative longitudinal location that maintains in excess of ten thousand pounds of longitudinal stress in both the support member and the sleeve member; and flexible fluid-impermeable means sealing the outlet on the end of the support member and enabling pressure equalization between the interior and exterior of the sleeve member.

References Cited by the Examiner

UNITED STATES PATENTS

| | | | |
|---|---|---|---|
| 1,759,780 | 5/1930 | Figari | 29—446 X |
| 2,735,168 | 2/1956 | Leonhardt et al. | 29—452 |
| 2,949,591 | 8/1960 | Craige | 336—92 X |
| 2,964,698 | 12/1960 | Lehmberg | 324—10 |
| 2,986,695 | 5/1961 | Buell | 324—10 |
| 3,066,404 | 12/1962 | Jones | 29—452 |
| 3,079,549 | 2/1963 | Martin | 324—1 |

WALTER L. CARLSON, *Primary Examiner.*

G. R. STRECKER, *Assistant Examiner.*